US006966765B2

(12) United States Patent
Bajema

(10) Patent No.: US 6,966,765 B2
(45) Date of Patent: Nov. 22, 2005

(54) ROTATING CIRCULAR DIE

(75) Inventor: Rick Wendell Bajema, Plano, TX (US)

(73) Assignee: Frito-Lay, North America, Inc., Plano, TX (US)

( * ) Notice: Subject to any disclaimer, the term of this patent is extended or adjusted under 35 U.S.C. 154(b) by 109 days.

(21) Appl. No.: 09/990,943

(22) Filed: Nov. 9, 2001

(65) Prior Publication Data
US 2003/0091710 A1 May 15, 2003

(51) Int. Cl.[7] ............................................. B29C 47/24
(52) U.S. Cl. .................... 425/170; 425/381; 425/467; 425/468; 425/382.3; 425/169
(58) Field of Search ............................... 425/380, 465, 425/378.1, 381, 382.3, 466, 467, 468, 169, 425/170

(56) References Cited

U.S. PATENT DOCUMENTS

| | | | | |
|---|---|---|---|---|
| 3,279,501 A | * | 10/1966 | Donald | 138/118 |
| 3,311,952 A | * | 4/1967 | Kovach et al. | 425/467 |
| 3,985,490 A | * | 10/1976 | Kader | 425/381 |
| 4,444,702 A | * | 4/1984 | Thomas et al. | 264/412 |
| 4,541,793 A | * | 9/1985 | Lindqvist | 425/206 |
| 4,573,893 A | * | 3/1986 | Waters et al. | 425/71 |
| 4,680,191 A | | 7/1987 | Budd et al. | |
| 4,731,216 A | * | 3/1988 | Topolski | 264/503 |
| 5,639,409 A | * | 6/1997 | van Muiden | 264/108 |
| 6,547,551 B2 | * | 4/2003 | Omi et al. | 425/133.1 |

* cited by examiner

Primary Examiner—Joseph S. Del Sole
(74) Attorney, Agent, or Firm—Colin P. Cahoon; Carstens & Cahoon, LLP

(57) ABSTRACT

A rotating circular die for mounting on an extruder. The die incorporates an inner component comprising a cone with support independent of the outer component and extruder, thereby permitting forward and backward adjustment of the inner component in relation to the outer component during actual processing. Independent support for the inner cone eliminates the sanitary and microbial concerns that are present when die assemblies are housed within the extruder. The inner cone is self-centering to provide extrudate of uniform thickness and capable of imparting rotational shearing stresses on the extrudate to provide for starch alignment. The rotation of the inner component considered with the positional adjustability produces uniform extrudate as well as minimizes production downtime by reducing clogging and backup risks and providing for easy clean up.

2 Claims, 3 Drawing Sheets

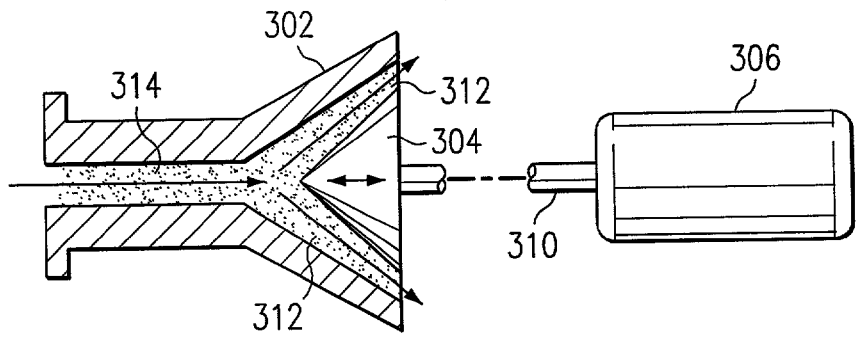
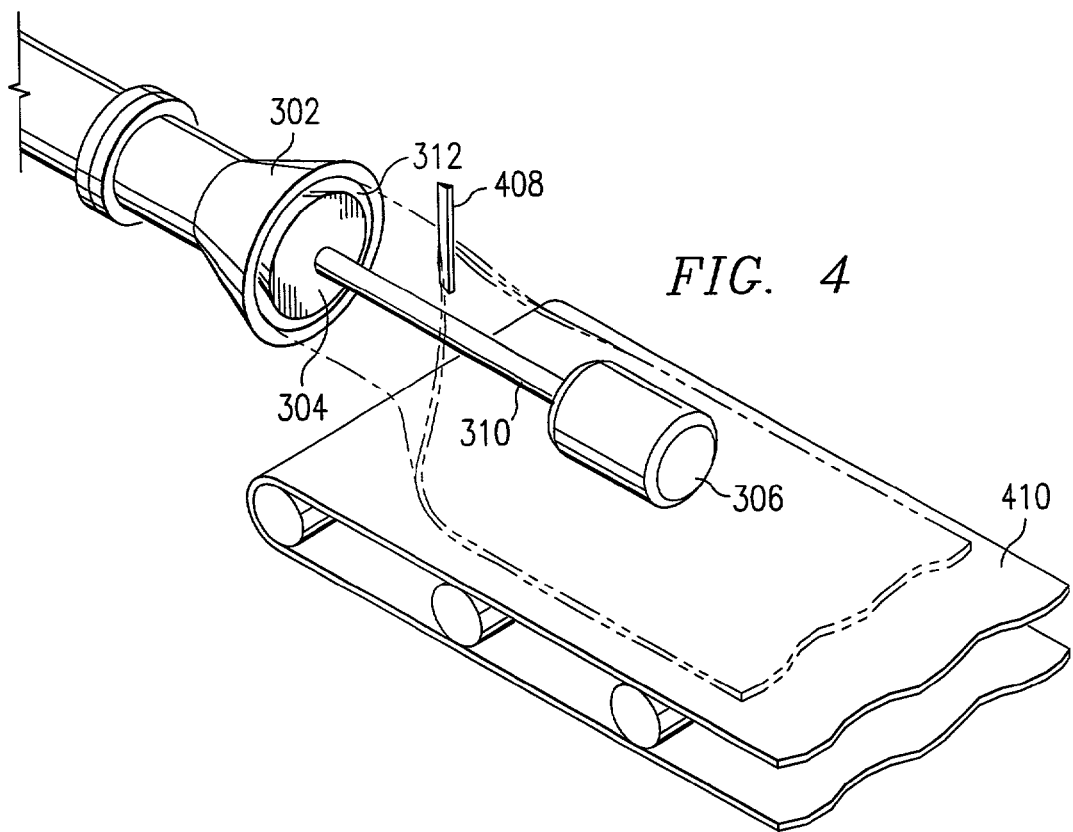

ROTATING CIRCULAR DIE

BACKGROUND OF THE INVENTION

1. Technical Field

The present invention relates to a rotating circular die for producing an extruded food product and, in particular, to an improved extruder die assembly that incorporates an independently supported inner cone which can be easily adjusted during processing to vary the thickness of the extrudate and maintain extrudate uniformity.

2. Description of the Related Art

Extrusion devices used in the food industry introduce a dough into a device and convey it via, for example, a screw pump to an inlet where the substance is forced through an extruder die. The extruder die is employed to perform a variety of functions, including forming or shaping the extrudate, and compressing and reducing the cross sectional area of the extrudate.

One example of a commonly employed extruder die is a die comprising a linear extrusion exit channel. In operation, the extrudate is forced through the extruder passageway and through the linear die channel. The size of the channel may be adjusted by various means, such as using flexible upper and lower die lips to produce a range of possible extrudate thicknesses. In order to accommodate the linear die, however, the shape of the extruder passageway prior to the die is broadened in width, and flattened in height. Since a linear die has different flow path lengths, the passageway shape is varied to produce a pressure gradient in an attempt to achieve a uniform flow rate across the die. As a result, the flow rate can be lower at the edges than in the center of the channel, resulting in non-uniform extrudate. In addition, undesired thickness variations in the extrudate can be found in the die channel direction as well as in the direction of extrusion.

Another example of a commonly employed extruder die is a circular die comprising an outer ring component and an inner circle component that are fixed to form an annular extrusion exit channel. During processing, the extrudate is forced through the extruder passageway and through the circular channel between the stationary outer and inner components of the circular die. The travel distance for the extrudate in the passageway to any exit point on the circular die is consistent. Thus, the circular die avoids the thickness variation problems and extrudate flow problems inherent in the linear die. However, the circular die does not offer the flexibility of easily adjusting the die components to vary the thickness of the extrudate. To vary the thickness of the extrudate, either the outer or inner component of the die must be removed and replaced with another component that will provide the desired thickness setting. This lengthy process is cumbersome and also costly to manage, for production must be suspended until the replacement is installed.

FIGS. 1 and 2 show a circular die apparatus as disclosed in U.S. Pat. No. 4,680,191 to Budd et al. FIG. 1 shows a side view partially cut away of the die and extruder assembly, while FIG. 2 is a bottom plan view of the exit end of extruder. Corresponding reference numerals are used to represent corresponding elements unless otherwise indicated.

The circular die assembly of the '191 Patent comprises an outer facing 202 and inner facing 204, both of which can be rotated in a clockwise or counterclockwise direction. The outer and inner facings 202, 204 contain serrated edges that impart ridges and valleys on each side of the extrudate flow as it passes through a circular channel 206. Rotating one or both of the outer and inner facings 202, 204 during the extrusion process produces corrugations on one side of the extrudate at an angle to those on the other side. As a result, the corrugated end product achieves a different texture, flavor and appearance from non-corrugated products. However, the rotation speed of the die components cannot exceed a certain threshold wherein the serrated edges no longer impart distinct ridges and valleys on the surfaces of the extrudate. Thus the Budd device must rotate at a relatively low speed, such that the tangential velocity of the rotating portion of the device in contact with the extrudate is at most equal to the linear velocity of the extrudate upon exiting the die.

In contrast, "high-speed rotation," meaning the rotational speed that produces a tangential velocity of the rotating portion of the device in contact with the extrudate that is greater than the linear velocity of the extrudate upon exiting the die, can be used as a means to create various different textures, flavors, and appearances of the end food product by further aligning the starch polymer chains in the extrudate. High-speed rotation allows the die to impart additional shearing stresses on the extrudate, thereby forcing the starch polymers into alignment in the direction of such shearing. Polymer alignment in the rotational direction of the extruder can be preferred over alignment only in the direction of the linear extrusion because bi-directional alignment provides for anticipation, control, and manipulation of the size, shape, and texture of the end food product. For example, extrudate or dry pellets subjected to high linear stress during extrusion expand during the frying process in directions perpendicular to the direction of the starch alignment caused by this linear stress. Stress induced on the extrudate by a rotating component provides for an additional direction of the starch alignment and various potential results produced by expansion of such a product. The result obtained by such expansion offers various possibilities over corrugated products of producing different sizes, shapes and textures of the end food product.

In addition, the higher the rotation speed, the more such rotation provides a means to prevent backup of extrudate by grinding out clogs in the die. Clogs of extrudate can form in the extruder passageway and become caught in the die channel. As a result, the normal flow of extrudate is hampered and a backup occurs in the passageway. To remove the back up, production may need to be interrupted in order to clear the clog from the extrudate pathway. Rotation allows the die to be self-clearing by breaking up and grinding out the clogs to prevent extrudate backup. Thus, rotation reduces plugging risk and provides a simpler and efficient solution to the costly alternatives of clearing clogs.

Although the Budd et al. device avoids the thickness variation problems inherent in the linear die for the same reasons as does the fixed circular die, the thickness of the extrudate exiting from die cannot be adjusted without replacing the inner or outer component with one with different dimensions. Replacing a component requires stopping production and dismantling the die assembly. This is a time-consuming operation and processing cannot resume until after the die is dismantled and reassembled with the new die component. Additionally, the die assembly must be dismantled to clear a clog or to clean the extruder and die assembly. Such cleaning, unclogging or component replacement times can result in reduced production and costly production down time.

FIG. 1 shows a cut-away side view of the '191 extrusion system which includes an extrudate passageway 102 and circular die assembly. The support for the inner facing 204 and its driving means 210 are housed within the extruder passageway 102. Placement of the inner facing components within the extruder can be problematic, however, since the inner facing components have additional surfaces to which food particles can adhere. This may result in additional or increased extruder cleaning periods and thus shortened production periods. In addition, the direct contact between the extrudate and the bearings and seals of the housings may result in sanitary and microbial spoilage issues.

Consequently, a need exists for a rotating circular die wherein the channel between the inner and outer components of the die can easily be altered to allow for various thicknesses of the extrudate, even during processing. In order to eliminate potential sanitary, reliability, and cleaning problems related to seal maintenance and extrudate contact with bearings or seals, the die components should not be housed within the extruder passageway. In addition, it would be desirable to produce a die with easily adjustable components that provide simple and efficient means to clear clogs and clean the extrudate pathway. Furthermore, a need exists for a die that provides for uniform thickness of the extrudate as it exits the die and also be capable of imparting rotational shearing stresses on the extrudate in order to provide for more control of biopolymer, such as starch, alignment. It would also be desirable to produce a die having means to heat and cool the die surfaces to vary the texture and appearance of the food product and also be able to monitor the consistency of the extrudate by either measuring the force the extrudate exerts on the die or the torque necessary to rotate the die and/or the extrudate temperature, or combinations thereof.

SUMMARY OF THE INVENTION

The proposed invention comprises a rotating circular die assembly for use with an extruder that provides a means to easily adjust the thickness of the extrudate during processing and eliminates sanitary problems associated with housing the die assembly within the extruder passageway.

The die assembly is comprised of outer and inner components capable of clockwise and counterclockwise rotation and aligned to form a circular extrusion channel. The inner component comprises a drive and support assembly that is located outside the extruder apparatus. Thus, as the extrudate is forced through the extruder passageway and towards the rotating circular die, no bearings or seals of the inner component housing are in direct contact with the extrudate.

In order to achieve the desired thickness of extrudate, the opening of the annular die channel formed between the inner and outer components can be easily varied by adjusting the position of the inner component forward or backward in relation to the outer component. Further adjustment of the position of the inner component allows easy access to the extruder and die for cleaning purposes and for clearing extrudate clogs. In addition, the inner component has a tendency towards self-centering, thereby producing extrudate of uniform thickness. While rotating, the die is self-clearing and capable of imparting rotational shearing stresses on the extrudate in order to provide for starch alignment in the direction of such stress. The inner component may be used as a rotational viscometer by monitoring the torque on same and/or a mechanical force sensor by monitoring the linear force exerted against the component, thus allowing for precise viscosity and pressure measurements directly at the die to be used as process indicators of extrudate flow at the die. If undesired measurements are obtained, adjustments to the composition of the extrudate may be made at the extruder opening or action can be taken to prevent clogs and extrudate backup. Furthermore, the components may house devices used to heat and/or cool the contact surfaces of the outer and inner cones independently to produce differences in structure, appearance and texture of the extruded product.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 3 is a schematic view of one embodiment of the present invention;

FIG. 4 is a perspective view in elevation of one embodiment of the present invention.

DETAILED DESCRIPTION

Figure 1:
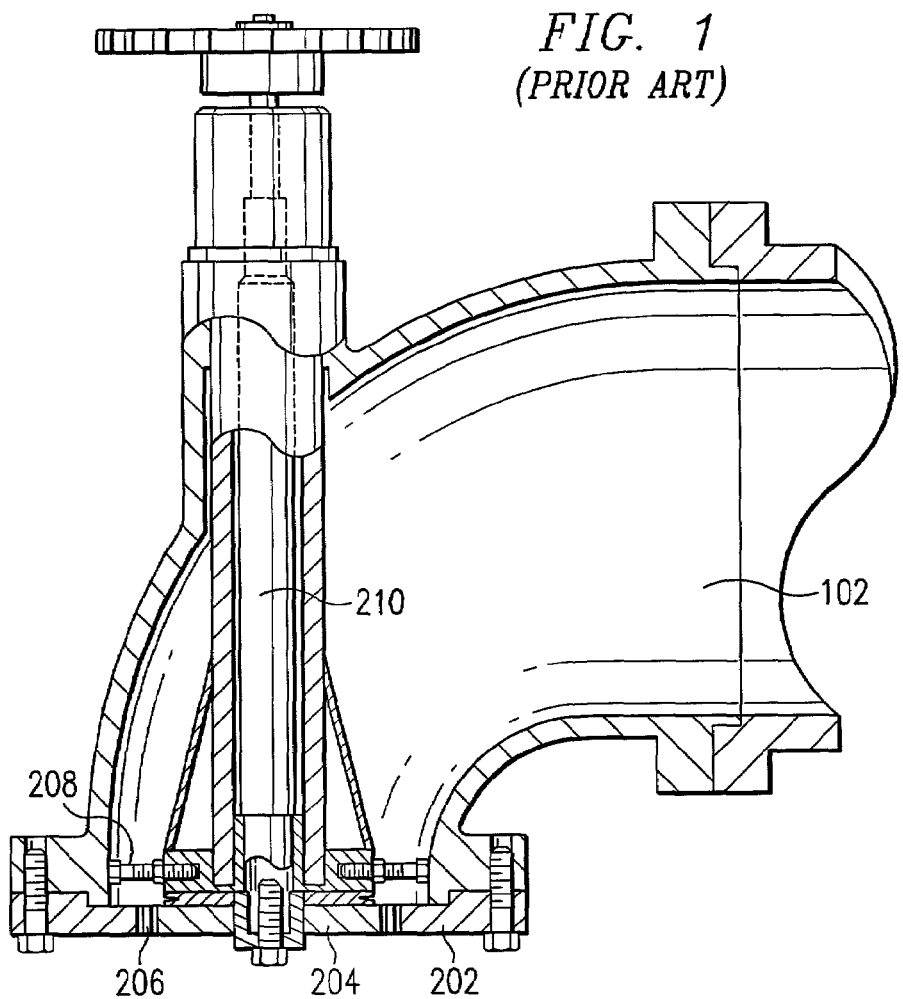
FIG. 1 is a side view, partially in cross-section, of prior art circular die.
Figure 2:
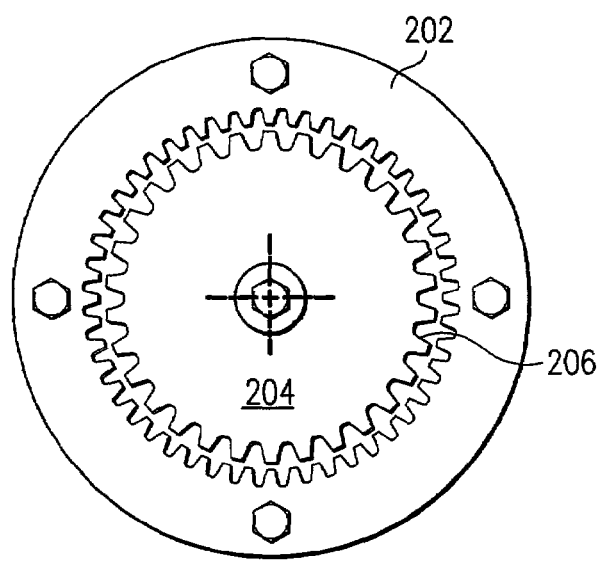
FIG. 2 is a bottom plan view in elevation of a die face of a prior art circular die.

FIG. 3 illustrates a schematic presentation of one embodiment of the present invention. The die assembly of the present invention comprises an outer die or component 302, with a generally conically shaped opening or exit port connected via attachment means to an extruder assembly (not shown), and the inner cone 304 nested in non-contact with the outer die 302, having its own support and drive assembly 306 outside the extruder. The die 302 and the cone 304 are positioned to form an annular channel 312. The outer die 302 is in fluid communication with an extruder by means commonly known in the art. Dough 314 is forced into the outer die 302, contacts the inner cone 304, and proceeds between the outer die 302 and inner cone 304 to the exit channel 312. Pressure and dwell time for the extrudate is equal around the circumference of the exit 312.

The inner cone 304 is connected to a support assembly via a shaft 310 and is capable of clockwise and counterclockwise axial rotation. In another embodiment of the invention, the outer die 302 may also independently rotate axially in a clockwise or counter clockwise direction while the inner die rotates as well.

FIG. 4 illustrates a perspective view of a circular die extrusion system in accordance with a preferred embodiment of the subject invention. More specifically, the subject circular die assembly comprises an outer die 302 that is mounted onto an appropriate component of an extruder (not shown) and an inner cone 304 supported outside the extruder by a shaft 310 connected to a motor 306 or other driving means. The process is initiated by introducing a dough into the entrance of the extruder. The extrudate is then forced through the circular extruder passageway and circular die assembly and exits, as is shown in phantom, in a cylindrical shape. One or more cutting devices 408 are provided to cut the cylindrical sheet of extrudate into one or more sheets. A conveyor means 410, positioned to accommodate the inner cone shaft 310, motor 306, and support mechanism (not shown), is provided to receive and transport one or more sheets of extrudate for further processing.

The die components of the present invention may be rotated axially at high or low speeds. High-speed rotation, as such term is defined above, is desirable for it further promotes self-clearing of the die. When a clog of extrudate forms, it may get lodged in the die and hinder the progress of the extrudate. Prior art assemblies require that the die be taken apart in order the clear the clog from the die. In contrast, the present invention can utilize high-speed rotation wherein the die is able to efficiently grind out the clog before the clog impedes the flow of extrudate. This self-clearing capability reduces plugging risk, prevents a backup of extrudate and enhances efficiency for the lengthy process of disassembly of the die is not necessary.

In addition, Applicant's invention can utilize the high-speed rotation of the cone 304 (and outer die 302 in conjunction with rotation of the cone 304) to impart a further orientation to the starch molecules in the extrudate in the direction of the stress imparted by the rotation. As the extrudate is forced through the die channel 312, the high-speed rotation imparts a bi-directional shearing stress on the extrudate. This process forces the starch polymer chains to align in the directions of the imparted stresses. Such alignment may be preferred over a uni-directional alignment because bi-directional alignment provides various possibilities for the appearance and texture of the end food product. The ability to spin the cone 304 also provides a means for further working the extrudate.

The inner cone 304 is capable of forward, backward and centering movement with regard to the outer die 302. This is accomplished by attaching adjusting mechanisms (not shown) to the inner cone assembly, comprising the inner cone 304, shaft 310, and motor 306. Such adjustment mechanisms provide for positioning and adjustment of the inner cone assembly in all directions by, for example, the attachment of hydraulic or jackscrew actuated positioning rods, or other means known in the art, to the motor 306 and/or shaft 310. Forward and backward (or fore and aft) movement provides means for easily varying the thickness of the extrudate even during processing. In addition, it provides a means for quickly and easily clearing up the die if the extrudate backs up. Furthermore, the position of the inner cone 304 during processing may be fixed to produce uniformly thick extrudate, or it may be varied forward and backward in an oscillating manner to produce a product with variable extrudate thickness. In order to produce uniform extrudate width around the circumference of the exit 312, the inner cone 304 tends towards centering itself within the outer die 302 as a result of the rotation imparted on the inner cone 304 and the Bernoulli effect following therefrom.

Applicant's invention eliminates the need for the placement of bearings or seals in the extruder, because the inner component of the circular die assembly is entirely contained outside of the extruder assembly. This placement outside the extruder housing alleviates the problems inherent with additional surfaces in direct contact with the extrudate, problems that can be microbial and sanitary as well as reliability problems. Maintaining the seals of the inner component as well as the issue of having bearings and seals in direct contact with the extrudate are not a concern with the instant invention.

Another feature illustrated in FIG. 3 of a preferred embodiment of Applicant's invention is utilizing the inner cone 304 as a process indicator. A rotational viscometer may be employed as a process indicator to measure the viscosity of the extrudate at the die by sensing the torque required to rotate the cone 304 at a constant speed. The torque required is indicative of the viscous drag on the cone 304, and thus corresponds to the viscosity of the extrudate. Provided that the motor speed is constant, the torque will vary with changes in viscosity during mixing, and thus the absolute viscosity may be calculated and used to maintain a consistent composition of the extrudate. In addition, a mechanical sensor may be employed to measure the force of extrudate flow acting on the inner cone 304. This measurement provides a precise indicator of the extrudate pressure at the die face, a process parameter that is impractical to measure using prior art extruder dies. This process also provides a means to monitor the composition of the extrudate at the die so changes may be made to the mix if necessary. Furthermore, monitoring the extrudate forces acting on the cone 304 provides early notification of building pressures or blockages occurring at the die assembly so action can be taken to reduce the plugging risk and prevent a backup of the extrudate.

Applicant's invention also allows for adjustment of the temperature of the surfaces of the inner cone 304 and outer die 302. The outer die 302 and the inner cone 304 may house cooling and/or heating devices, such as heat transfer fluid jackets or an electrical mechanism, which will cool or heat the surfaces of each. The surface temperatures of the outer die 302 and the inner cone 304 may be adjusted independently of one another. Adjusting the surface temperature of each differently from one another can impart a different orientation or cook level on one side of the extrudate as compared to the other side, resulting in differences in texture and appearance.

In another embodiment of the invention, a pilot pin is used to center the inner cone 304 in relation to the outer die 302. This can be accomplished by attaching a pilot pin to the nose of the inner cone 304 and placing it in the well of the outer die 302 and through the extruder. The pin would fix the rotation of the inner cone 304 to rotate about the axis of the pin instead of relying on the inner cone's self-centering ability to produce uniform extrudate. Further, external alignment can be provided by the adjustment mechanisms discussed above.

Such pilot pin, if attached to the end of the extruder screw (not shown), would provide the additional benefit of balancing the forces acting on the extruder screw and inner cone 304. The extruder screw experiences a force opposite of the extrudate flow, while the inner cone 304 experiences a force in the direction of extrudate flow. Consequently, coupling the extruder screw and inner cone would tend to balance the forces acting upon each.

Figure 5A:
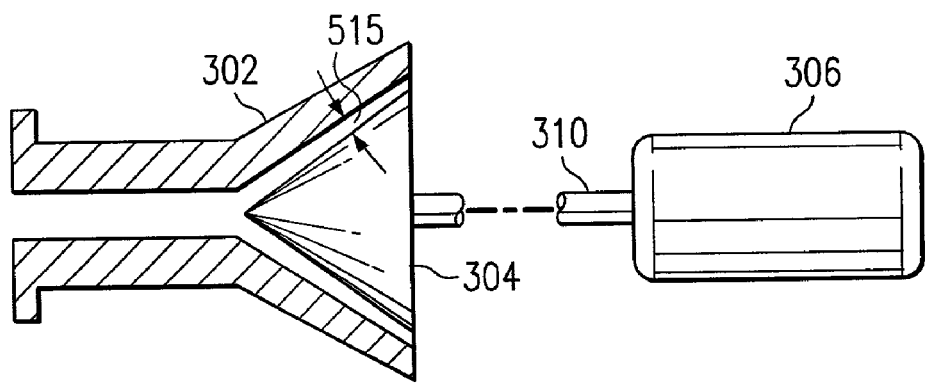
FIGS. 5a, 5b, and 5c are schematic views of several alternative embodiments of the present invention.
Figure 5B:
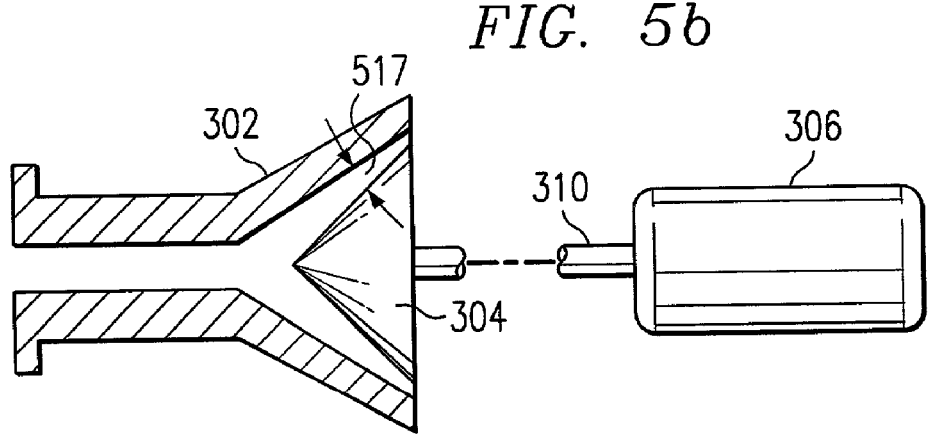
Figure 5C:
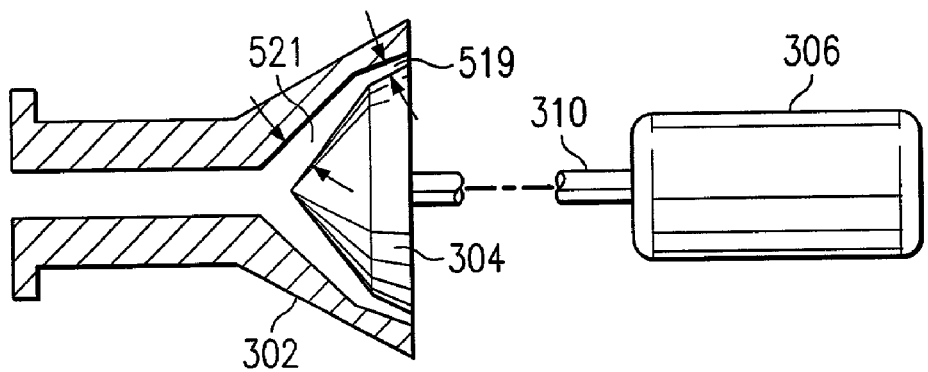

FIG. 5 illustrates schematic views of alternative embodiments of the present invention. FIGS. 5a, 5b, and 5c show various angles between the inner cone 304 and outer die 302 that can be created by adjusting the shape of the inner cone 304 and/or outer die 302. Again shown are the drive shaft 310 and motor 306. In FIG. 5a, the inner cone 304 is shaped to create a relatively shallow angle between the inner cone 304 and outer die 302. In FIG. 5b, the inner cone 304 is shaped to create a wider relative angle between the inner cone 304 and outer die 302, which is not anticipated to exceed in a preferred embodiment 45°. In FIG. 5c, the inner cone 304 and outer die 302 have both a shallow relative angle 519 towards the exit of the die and a wider angle 521 towards the interior of the die. The embodiment shown in FIG. 5a results in a higher pressure loss from the tip of the inner cone 304 to the exit of the die, consistent centering orientation of the inner cone 304, but higher torque requirements. The embodiment shown in FIG. 5b results in the least amount of pressure loss, is less stable in centering orientation, but requires less torque for rotation. The embodiment shown in FIG. 5c is a middle ground between the two previous embodiments with regard to pressure loss, centering orientation, and torque required.

It should also be understood that the invention described herein can be used in applications other than traditional starch based extrusions. The polymer orientation imparted by the rotating feature of the invention can be used not only with starch based products but other biopolymers and non-food related products as well.

While the invention has been particularly shown and described with reference to a preferred embodiment, it will be understood by those skilled in the art that various changes in form and detail may be made therein without departing from the spirit and scope of the invention.

What is claimed is:

1. A circular die for extrusion, said die comprising:
   an outer die having a generally conically shaped opening and in fluid communication with an extruder;
   an inner cone nested in non-contact with said outer conically shared die opening;
   a drive shaft connected to said inner cone and located outside of said outer die such that said drive shaft is not in contact with the extrudate, wherein said inner cone rotates axially with said drive shaft; and,
   a device for monitoring the torque applied on the inner cone.

2. A circular die for extrusion, said die comprising:
   an outer die having a generally conically shaped opening and in fluid communication with an extruder;
   an inner cone nested in non-contact with said outer conically shaped die opening;
   a drive shaft connected to said inner cone and located outside of said outer die such that said drive shaft is not in contact with the extrudate, wherein said inner cone rotates axially with said drive shaft; and,
   a device for monitoring the force applied by the extrudate on the inner cone.

* * * * *

UNITED STATES PATENT AND TRADEMARK OFFICE
CERTIFICATE OF CORRECTION

PATENT NO. : 6,966,765 B2  Page 1 of 1
DATED : November 22, 2005
INVENTOR(S) : Rick Wendell Bajema It is certified that error appears in the above-identified patent and that said Letters Patent is hereby corrected as shown below:

<u>Column 8,</u>
Line 2, delete "shared" and insert -- shaped --.

Signed and Sealed this

Ninth Day of May, 2006

JON W. DUDAS
*Director of the United States Patent and Trademark Office*